United States Patent Office 2,710,874
Patented June 14, 1955

2,710,874

PROCESS OF PREPARING ORGANIC ARSENICAL COMPOUNDS, AND PRODUCTS OBTAINED THEREBY

Walter Julius Freund, Victoria, Australia

No Drawing. Application February 14, 1949, Serial No. 76,424

3 Claims. (Cl. 260—438)

The invention, in general, relates to the production of compounds useful in the treatment of diseases. More particularly, the invention relates to the preparation of compounds that are valuable as chemotherapeutic agents, or as intermediaries to such agents; the process embracing the combination, employing diazo solutions of p-arsanilic acids or substituted p-arsanilic acids or p-aminophenylarsineoxide with suitable organic compounds.

Numerous methods heretofore have been developed with respect to the preparation of various organic arsenical compounds. Substantially all known methods, for example, of preparing arsonic acids are reviewed in Organic Reactions, vol. 2, chapter 10 (J. Wiley & Sons, Inc., New York—Chapman & Hall Ltd., London) by C. S. Hamilton & J. F. Morgan of the University of Nebraska.

The introduction of aryl groups into other organic compounds by using diazo compounds has been known for a considerable time and has been described in scientific literature as well as in patent specifications, although in no case that I am aware of has the introduction of an arylmetalorganic acid group or arylarsineoxide group been achieved.

W. E. Bachmann and R. A. Hoffman give, in Organic Reactions, vol. 2, chapter 6, a comprehensive review of the preparation of by-aryls by the diazo reaction and the nitrosoacetylamin reaction.

The introduction of aryl groups into quinone is disclosed in British patent specification, No. 390,029, German patent specification, No. 508,395, and United States Patent No. 1,735,432. Many substituted quinones have been prepared by D. E. Kvalnes (J. Am. Chem. Soc. 56, 2478–1934) employing the methods described in these specifications.

Martini-Bettolo and Rossi (Gazz. Chim. Ital. 71, 627–35, 1941 and ibid. 72, 208, 1942) describe the preparation of aryl substituted naphthoquinones by employing diazo solutions. O. Neunhoeffer and J. Weise (Ber. 71, 2703–7) have prepared aryl substituted 2-oxynaphthoquinones.

The synthesis of 2-arylthiophenes by using diazocompounds (resp. solutions) is reported by M. Gomberg and W. E. Bachmann (J. Chem. Soc. 46, 2339–43, 1924) and the synthesis of 2-arylfuranes was reported by A. W. Johnson (J. Chem. Soc. 1946, 895).

British patent specification, No. 480,617 and United States patent specification, No. 2,292,461 disclose the introduction of aryl groups in the $\alpha,\beta$-unsaturated non-quinone compounds.

In J. Am. Chem. Society 65, 57, 1943, C. F. Koelsch described the coupling of aromatic diazo-solutions with acrylonitrile and methyl acrylate.

Ph. l'Ecuyer and F. Turcotte (Can. J. Res. 25:575: (1947)), succeeded in coupling m-nitrocinnamic acid.

Ph. l'Ecuyer, F. Turcotte, J. Giguere, C. A. Olivier and P. Roberge (Can. J. Res. 26:70:(1948)) succeeded in coupling p-nitrocinnamic acid, by using very large amounts of acetone to keep the nitro acid in solution.

F. Bergmann, E. Dimant and H. Japhe (J. Am. Chem. Soc. (1948) 1612) describe the coupling of $\beta,\beta$-diarylacrylic acids to obtain triarylethylenes.

It has now been found that, in these reactions, diazotised arsanilic acids or diazotised substituted arsanilic acids or diazotised p-aminophenylarsineoxide may be used leading to new arsenic containing compounds, which, per se, are valuable as chemotherapeutic agents or as intermediaries to such agents.

A primary object of the present invention is to provide an improved process of preparing organic arsenicals wherein the isolation of new and valuable arsonic acids or arsineoxides are effected in a relatively facile manner.

Another important object of my invention is to provide an improved process of the indicated nature for affording the aforesaid new and valuable chemotherapeutic agents of intermediaries thereto, which is characterized by the employment of diazotised arsanilic acids or substituted arsanilic acids or diazotised p-aminophenylarsineoxides with compounds capable of arylation between a predetermined pH range.

A still further object of the invention is to provide a process of the aforementioned character which embraces the utilization of such quantities of a cupric salt, preferably cuprichloride as catalyst, that sufficient cuprichloride is present to form a salt with the new arsonic acid or a complex compound with a new arsineoxide.

Another object of the invention is to provide a process of the indicated nature affording in a relatively simple and facile manner new arsonic acid or arsineoxide compounds which are efficaceous in the treatment of specific types of diseases in that the new compounds have a specific toxic effect upon disease-producing microorganisms without deleteriously affecting the patient treated.

The foregoing and other objects are attained by following preferred embodiment of my improved process, examples being set out for purposes of clarity and explanation.

In its preferred mode, the process of preparing organic arsenicals of my present invention preferably comprises reacting diazo solutions of arsanilic acids or diazo solutions of p-aminophenylarsineoxides with compounds which are capable of arylation between a range of approx. pH 6, together with simultaneous addition of a catalyst, preferably a cupric salt, in such suitable amount as to facilitate the isolation of new arsonic acids as copper salts, in the case of arsineoxides as complex compounds with copper chloride.

Practical embodiments of the improved products have been successfully prepared, in accordance with my invention in the improved process, by utilizing the following substances in the amounts and proportions indicated and carrying out the following steps; it being understood that the examples set forth are for purposes of exemplification and that I am not to be restricted to the precise embodiments of the invention described nor to the precise order of steps of preparation of the products as are set forth in the following examples:

Example 1

21.7 g. of p-arsanilic acid (1/10 mol), dissolved in a solution of 4.2 g. NaOH (> 1/10 mol) in approximately 200 ml. of water, are mixed with a solution of 7.3 g. of NaNO$_2$ (> 1/10 mol) in 20 ml. of water and diazotized with 60 g. of 25% HCl in the usual manner.

The diazotized solution is then added to a solution of 14.8 g. (1/10 mol) of cinnamic acid dissolved in 200 ml. of acetone in which approximately 70 g. of crystallized sodium acetate are suspended.

The combined solutions are well shaken or stirred and tested to make sure that it has been buffered to a pH value of approximately 6. Then a solution of 20 g. of $CuCl_2$ dissolved in 45 ml. of water is added by drops and the whole solution warmed gently of a water bath to commence gas evolution. The new arsonic acid separates out as Cu-salt, a buff-colored precipitate.

As the Cu-ion disappears from the solution by being absorbed in the formation of a salt with the new arsonic acid, it must be replaced by addition of fresh $CuCl_2$ solution in order to obtain a good yield.

The reaction takes 3–4 hours, during which the solution is well stirred or agitated. When the evolution of gas ceases, the precipitate is allowed to settle, the supernatant liquid is decanted and the precipitate twice agitated with 100–150 ml. of acetone in order to remove any unreacted cinnamic acid.

These acetone washings are mixed with the first decanted mother liquor from which by conventional methods some cinnamic acid may be recovered. The precipitate is now collected on a Büchner, and air dried. The dried material is digested with approximately 2 n NaOH solution in which the new arsonic acid is easily soluble, the copper being precipitated. After filtration from the copper-hydroxide, the alkaline solution is made acidic with HCl whereafter the arsonic acid is precipitated as light yellowish solid which is collected on a Büchner, pressed on a porous tile and finally dried in a desiccator. It can be recrystallized from glacial acetic acid, from which buff colored plates separate which melt above 300° C. The reaction proceeded, to the greater part, according to the following equation:

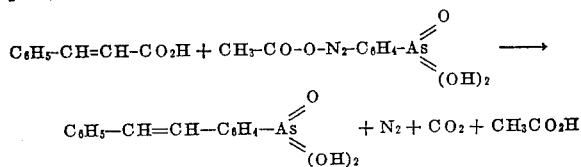

or stilbene-4-arsonic acid, or 4-arsono-stilbene.

p-Hydroxycinnamic acid reacts easily under the above mentioned conditions using sodium chloroacetate as buffer. The splitting off of $CO_2$ in this reaction is restricted to individual cases. For instance, the reaction of p-methoxy-cinnamic acid gives as the main product α-(p-arsonophenyl) - p - methoxycinnamic acid. The reaction itself and the yields depend on the solubility of the starting material, i. e., the cinnamic (or substituted cinnamic) acid in a mixture of water and acetone, p-chlorocinnamic acid being sparingly soluble in water acetone needs several 100 ml. of acetone to undergo the reaction and gives only a poor yield; p-methylcinnamic acid reacts easily on the other hand to yield 4'-methylstilbene-4-arsonic acid while hydroxycinnamic acid yields under the above mentioned conditions though in poor yield 3'-nitro-4'-hydroxystilbene-4-arsonic acid.

Example II 10.85 g. (1/20 mol) of p-arsanilic acid dissolved in a solution of 2.1 g. of NaOH (>1/20 mol) in approximately 100 ccm. of water are mixed with a solution of 3.65 g. of $NaNO_2$ (> 1/20 mol) in 10 ccm. of water and diazotized with 30 g. of 25% HCl in the normal way. This diazo-solution is added to a solution of 7.3 g. (1/20 mol) of coumarin of 100 ml. of acetone in which 35–40 g. of crystallized sodium acetate is suspended. After adding the diazo-solution to the acetone, gas evolution sets in immediately after the pH has adjusted itself to approximately 6. The $CuCl_2$ solution is added as in Example I. The new arsonic acid: -3-(p-arsonophenyl-coumarin is recrystallized from glacial acetic acid from which it separates as yellowish plates.

Example III 9.15 g. (1/20 mol) of p-aminophenylarsineoxide dissolved in a solution of 2.1 g. (> 1/20 mol) of NaOH in approximately 70 ccm. of water are mixed with 3.65 g. (> 1/20 mol) of $NaNO_2$ in 10 ccm. of water and diazotised with 32 ccm. 25% HCl diluted with the same amount of water. The diazo-solution is filtered and added to a solution of 7.3 g. of coumarin (1/20 mol) in 150 ccm. of acetone in which 20–25 g. of crystallised sodium acetate is suspended. After the pH has adjusted itself to 6 a solution of 4 g. $CuCl_2$ in 10 ccm. of water is added slowly. Gas evolution sets in immediately after addition of copper chloride solution and is brisk at 21° C. and lasts for about 1 hour. After standing for some time a buff coloured precipitate is filtered off, washed with acetone in order to remove unreacted coumarin and then dissolved in diluted NaOH and filtered from precipitated copper hydroxide. The alkaline solution on acidification with diluted HCl precipitates a brownish solid which is collected on a Büchner, washed with water, pressed on a porous tile and then washed with absolute alcohol. The brown coloured compound is dried in a vacuum desiccator. It is free of nitrogen and does not dissolve in bicarbonate solution (as distinct from the product obtained from coumarin and p-arsanilic acid) but dissolves in NaOH solution. The compound is microcrystalline.

Example IV 10.85 g. (1/20 mol) of p-arsanilic acid is diazotized as in Example II, and added to a solution of 6.9 g. of furylacrylic acid in 120 ml. of acetone in which 35–40 g. of crystallized sodium acetate is suspended. After adding the diazo-solution to the acetone and agitating, gas evolution immediately commences and even without addition of the $CuCl_2$ solution becomes violent. The temperature, which after the addition of the diazo-solution to the acetone is approximately 8–10° C. rises to 24–26° C. and it is advisable to retard the reaction by cooling. In any case, the addition of the $CuCl_2$ solution is advantageous as the Cu-salt of the arsonic acids formed is easily separated. The Cu-salt is separated as in Example I. Two arsonic acids were obtained from the air dried crude arsonic acid precipitate. On digestion with absolute alcohol a part went into solution and could be obtained in crystalline form. The arsonic acid insoluble in alcohol was dissolved in sodium bicarbonate solution and re-precipitated with HCl. Both acids melted above 300° C. The alcohol soluble acid gives in glacial acetic a strong blue fluorescence.

Example V 10.85 g. (1/20 mol) of p-arsanilic acid are diazotized as in Example II and added to a solution of 5.4 g. (1/20 mol) of p-quinone in 100 ml. of acetone in which 35–40 g. of crystallized sodium acetate is suspended. After adding the diazo-solution to the acetone and agitating, gas evolution sets in immediately and becomes quite violent without cooling. $CuCl_2$ solution is added as Cu-salt of the new arsonic acid is easily isolated. The resulting solid is separated as in Example I. Very small amounts can be recrytsallized from 60 percent acetic acid.

Example VI 10.85 g. (1/20 mol) of p-arsanilic acid are diazotized as in Example I, and added to a solution of 4.2 g. (1/20 mol) of thiophene in 100 ml. of acetone in which 35–40 g. of crystallized sodium acetate is suspended. 10 g. of $CuCl_2$ solution is added and the solution warmed on a water-bath to 20–22° C. when gas evolution sets in. Agitating or stirring is kept up for approximately one hour when the addition of the $CuCl_2$ solution should be completed. The solid which is obtained is separated as above described. The arsonic acid can be recrystallized from alcohol or glacial acetic. From the latter it separates in yellowish globules.

10.85 g. (1/20 mol) of p-arsanilic acid are diazotized as under Example II. The diazo-solution is added to 3.4 g. (1/20 mol) of furan in 100 ccm. of acetone in which 40 g. of crystalline sodium acetate are suspended. Gas evolution sets in immediately and 10 g. of CuCl₂ dissolved in approximately 20 g. of water are added slowly. After one hour, approximately, gas evolution ceases and the precipitate formed is worked up as under Example II. The arsonic acid 2-(p-arsonophenyl)-furan dissolves with reddish color in alcohol showing a blue fluorescence from which it separates in yellowish globuli or micro needles.

Example VIII 6.55 g. of 2-nitro-4-amino-phenylarsonic acid (1/40 mol) were dissolved in 2.1 g. sodium bicarbonate in 40 ccm. of water and mixed with 1.8 g. (>1/40 mol) of sodiumnitrite dissolved in 5 ccm. of water. This mixture was diazotised by dropping it in 16 g. of 25% HCl cooled in the usual manner. The diazo-solution was added to 4.1 g. (1/40 mol) of p-hydroxycinnamic acid dissolved in 100 ccm. of acetone to which a solution of 12 g. sodium chloroacetate in little water had been added. Gas evolution starts immediately and becomes violent after the addition of 2.5 g. of CuCl₂ in 10 ccm. of water so that cooling with ice water is advisable. The temperature rises eventually to 22° C. The gas evolution subsides after approximately 30 minutes. The solution is allowed to stand for some time. Then a brown precipitate is filtered off, dried on porous tile and in a vacuum desiccator. The precipitate was then digested with 30 ccm. of 2 n NaOH and filtered. The alkaline solution was acidified with dilute HCl and the precipitate formed filtered off, dried on porous tile and then in a vacuum desiccator. The dried material was digested with a cold bicarbonate solution and the insoluble material dried. It can be crystallised from glacial acetic acid. It is not molten at 300° C. and contains nitrogen. The original acetone containing mother liquor was allowed to stand for some time until all the acetone had evaporated. A solid then separated which was filtered off, and treated with cold bicarbonate solution which was filtered. The bicarbonate solution on acidification gives a precipitate which was washed and dried. It crystallises from watery alcohol in fine yellowish needles and melts at 190 to 192° C. This compound is nitrogen free.

Example IX 10.85 g. of p-arsanilic acid (1/20 mol) are diazotised as under Example II and added to a solution of 6.45 grms. of cinnamonitrile in 120 ccm. of acetone in which 20 g. of hydrated sodium acetate were suspended. After the pH had adjusted itself to approximately 6 a solution of 10 g. cupric chloride in 20 ccm. of water was added in small quantities. Gas evolution set in, and a brown precipitate began to form. After the whole of the copper chloride had been added the solution was allowed to stand for a certain time when the copper-salt of the new arsonic acid was filtered off and washed with acetone. The air dried material was digested in a solution of 200 ccm. of ice cold normal NaOH solution and the solution was filtered to remove the precipitated copper hydroxide. The filtrate on acidification with diluted HCl precipitated a solid which was filtered off, dried on porous tile and finally in the desiccator. It can be recrystallised from alcohol and contains nitrogen.

Example X 10.85 g. (1/20 mol) of p-arsanilic acid diazotized as under Example II was added to a solution of 6.6 g. (1/20 mol) of cinnamic aldehyde in 170 ccm. of acetone in which 20 g. of hydrated sodium acetate were suspended. After the pH had adjusted itself to approximately 6 a solution of 10 g. of cupric chloride in 20 ccm. of water was added in small quantities over a period of about 30 minutes. The copper salt of the new arsonic acid separated and the reaction mixture was allowed to stand for some time after which the solid copper salt was filtered off, washed with acetone and dried in a desiccator. It was then digested in a dilute solution of caustic soda and the precipitated cupric hydroxide removed by filtration. On acidifying the alkaline solution with 1/10 normal hydrochloric acid a resinous material was precipitated. This resinous material was dissolved in sodium bicarbonate solution and slowly precipitated with 1/10 n HCl giving a yellow powdery material which was removed by filtration. On allowing the mother liquor of the above mentioned yellow powdery material to stand over night, a small amount of yellow crystallized material slowly deposited. It can be recrystallized from alcohol.

The above examples all relate to the products obtained, using p-arsanilic acid, or substituted p-arsanilic acid or p-aminophenylarsineoxide. It is most probable, however, that by using o-arsanilic acid or m-arsanilic acid the same range of reactions may be undergone.

It is to be understood that the appended claims are to be accorded a range of equivalents commensurate in scope with the advance made over the prior art.

I claim:

1. A method of preparing organic arsenicals valuable as chemotherapeutic agents or as intermediaries thereto, said method comprising the steps of dissolving p-arsanilic acid in an alkali and mixing the same with an aqueous solution of sodium nitrite, then diazotizing the mixture, adding the diazo-solution to a solution of cinnamic acid dissolved in acetone containing suspended crystallized sodium acetate, buffering the combined solutions until the combination has attained a pH value of approximately 6, and then introducing into the diazotized solution of said pH value an aqueous solution of a cupric salt to effect isolation and precipitation of a buff-colored copper-salt.

2. A method as defined in claim 1 including the steps of allowing the precipitate to settle, decanting the supernatent liquid, then washing the precipitate with acetone to remove unreacted cinnamic acid, drying the precipitate and digesting with 2 N NaOH solution in order to decompose the copper salt getting the new arsonic acid as sodium salt in solution and precipitating the copper as hydroxide, filtering the copper hydroxide and acidifying the alkaline solution with HCl to precipitate the arsonic acid as a light-yellowish solid, then pressing the solid on a porous tile and drying the same in a desiccator.

3. As a new product of manufacture, stilbene-4-arsonic acid.

References Cited in the file of this patent

UNITED STATES PATENTS

| | | |
|---|---|---|
| 1,549,503 | Preiswerk et al. | Aug. 11, 1925 |
| 2,244,293 | Friedheim | June 3, 1941 |

OTHER REFERENCES

Goddard—Textbook of Inorganic Chem., vol. XI, part II, pages 194–196, 422, 423, 434.

Organic Reactions: Vol. II, pages 224–230.

Raiziss et al.: Organic Arsenical Compounds, 1923, The Chemical Catalog Co. Inc., N. Y. C., pages 260, 341, 352.

Organic Reactions, vol. 2, pages 417–8, Wiley, N. Y., 1944.